(12) United States Patent
Edquist et al.

(10) Patent No.: US 11,006,500 B1
(45) Date of Patent: May 11, 2021

(54) END OF LIFE DETECTION SYSTEM FOR AIRCRAFT ANTI-COLLISION LIGHT

(71) Applicant: B/E AEROSPACE, INC., Winston Salem, NC (US)

(72) Inventors: John Edquist, Milwaukee, WI (US); Jeremy Fredrich, West Allis, WI (US); Brendan M. Upton, East Patchogue, NY (US); Van Phifer, Greendale, WI (US)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 16/746,020

(22) Filed: Jan. 17, 2020

(51) Int. Cl.
| | |
|---|---|
| *H05B 45/58* | (2020.01) |
| *F21S 43/31* | (2018.01) |
| *H05B 45/12* | (2020.01) |
| *F21S 43/40* | (2018.01) |
| *F21V 23/00* | (2015.01) |
| *B64D 47/06* | (2006.01) |
| *F21S 43/14* | (2018.01) |
| *F21W 107/30* | (2018.01) |
| *F21Y 105/18* | (2016.01) |
| *F21Y 115/10* | (2016.01) |
| *F21W 103/10* | (2018.01) |

(52) U.S. Cl.
CPC .............. *H05B 45/58* (2020.01); *B64D 47/06* (2013.01); *F21S 43/14* (2018.01); *F21S 43/31* (2018.01); *F21S 43/40* (2018.01); *F21V 23/005* (2013.01); *H05B 45/12* (2020.01); *B64D 2203/00* (2013.01); *F21W 2103/10* (2018.01); *F21W 2107/30* (2018.01); *F21Y 2105/18* (2016.08); *F21Y 2115/10* (2016.08)

(58) Field of Classification Search
None
See application file for complete search history.

(56) References Cited

U.S. PATENT DOCUMENTS

| | | | | |
|---|---|---|---|---|
| 7,645,053 | B2* | 1/2010 | Machi | H05B 45/58 |
| | | | | 362/241 |
| 8,471,731 | B2* | 6/2013 | Lundberg | H05B 45/00 |
| | | | | 340/971 |
| 9,258,871 | B2* | 2/2016 | Mueller | H05B 45/10 |
| 9,889,948 | B2* | 2/2018 | Hessling von Heimendahl | ......... |
| | | | | B64D 47/02 |
| 10,299,343 | B2* | 5/2019 | Klein | B64D 47/06 |
| 10,362,657 | B2* | 7/2019 | Hessling-Von Heimendahl | ......... |
| | | | | F21V 17/06 |
| 10,495,282 | B2* | 12/2019 | Ramos, II | G02B 6/0055 |
| 10,732,030 | B2* | 8/2020 | Lendaro | H05B 45/58 |
| 2002/0145533 | A1* | 10/2002 | Bushell | B64D 47/06 |
| | | | | 340/815.4 |

(Continued)

FOREIGN PATENT DOCUMENTS

EP    3297404    3/2018

*Primary Examiner* — Amy Cohen Johnson
*Assistant Examiner* — Srinivas Sathiraju
(74) *Attorney, Agent, or Firm* — Snell & Wilmer L.L.P.

(57) ABSTRACT

An end of life detection system for an anti-collision light may comprise a reflector and a plurality of LEDs located around an exterior of the reflector. A trend LED and reference LED may be located in an interior of the reflector. The trend LED may be powered on with plurality of LEDs. The reference LED may be powered on during an initial power-on self-check and turned off after completion of the initial power-on self-check.

20 Claims, 6 Drawing Sheets

(56) References Cited

U.S. PATENT DOCUMENTS

| | | | | |
|---|---|---|---|---|
| 2003/0048203 | A1* | 3/2003 | Clary | G01C 23/00 340/945 |
| 2005/0007257 | A1* | 1/2005 | Rast | G08G 5/065 340/815.45 |
| 2006/0007012 | A1* | 1/2006 | Machi | B64D 47/06 340/815.45 |
| 2006/0007013 | A1* | 1/2006 | Singer | H05B 45/00 340/815.45 |
| 2014/0160774 | A1* | 6/2014 | Lapujade | B64D 47/06 362/470 |
| 2014/0355281 | A1* | 12/2014 | Lapujade | B64D 47/06 362/470 |
| 2015/0267893 | A1* | 9/2015 | Lapujade | F21V 13/04 362/299 |
| 2016/0153832 | A1* | 6/2016 | Lendaro | G01J 1/16 356/218 |
| 2017/0137148 | A1* | 5/2017 | Jha | F21V 29/89 |
| 2018/0016032 | A1* | 1/2018 | Jha | B64D 47/02 |
| 2018/0050820 | A1* | 2/2018 | Jha | B64D 47/06 |
| 2018/0050821 | A1* | 2/2018 | Schoen | B64D 47/06 |
| 2018/0084620 | A1* | 3/2018 | Klein | H05B 45/14 |
| 2018/0236926 | A1* | 8/2018 | Lee | B60Q 1/2696 |
| 2018/0334263 | A1* | 11/2018 | Hessling-Von Heimendahl | B64D 47/06 |
| 2019/0144132 | A1* | 5/2019 | Jha | H05K 1/181 362/470 |

* cited by examiner

END OF LIFE DETECTION SYSTEM FOR AIRCRAFT ANTI-COLLISION LIGHT

FIELD

The present disclosure relates to aircraft anti-collision lights and, in particular, to an end of life detection system for an anti-collision light.

BACKGROUND

Aircraft include anti-collision lights, for example, flashing red or white lights, located on an exterior of the aircraft to visually indicate the aircraft is in the vicinity. Each anti-collision light should meet regulatory requirements for light intensity. Current anti-collision lights tend to employ light emitting diodes, which can degrade in performance over time.

SUMMARY

An end of life detection system for an anti-collision light is disclosed herein. In accordance with various embodiments, the end of life detection system may comprise a reflector, a plurality of light emitting diodes located around an exterior of the reflector, a trend light emitting diode located in an interior of the reflector, and a reference light emitting diode located in the interior of the reflector. The trend light emitting diode may be configured to be powered on with plurality of light emitting diodes. The reference light emitting diode may be configured to be powered on during an initial power-on self-check and to be powered off after completion of the initial power-on self-check.

In various embodiments, a first optical sensor may be operationally coupled to the reference light emitting diode, and a second optical sensor may be operationally coupled to the trend light emitting diode. In various embodiments, the first optical sensor and the reference light emitting diode may be located in a first cavity defined by the reflector, and the second optical sensor and the trend light emitting diode may be located in a second cavity defined by the reflector.

In various embodiments, a first optical attenuator may be located between the reference light emitting diode and the first optical sensor, and a second optical attenuator may be located between the trend light emitting diode and the second optical sensor.

In various embodiments, a comparison circuit may be configured to compare a brightness of the trend light emitting diode to a brightness of the reference light emitting diode. In various embodiments, the comparison circuit may comprise an absolute threshold comparison circuit configured to compare an output of the first optical sensor to a predetermined absolute threshold, and a ratiometric comparison circuit configured to compare an output of the second optical sensor to the output of the first optical sensor.

In various embodiments, the plurality of light emitting diodes may be turned off if at least one of the output of the first optical sensor is less than the predetermined absolute threshold or a comparison of the output of the second optical sensor to the output of the first optical sensor is less than a predetermined comparison threshold.

In various embodiments, the reference light emitting diode may be configured to flash between one and ten times during the initial power-on self-check.

An anti-collision light is also disclosed herein. In accordance with various embodiments, the anti-collision light may comprise a light emitting diode circuit board, a reflector located over the light emitting diode circuit board, and a lens located over the light emitting diode circuit board and the reflector. The light emitting diode circuit board may include a plurality of light emitting diodes located around an exterior of the reflector, a trend light emitting diode located in an interior of the reflector, and a reference light emitting diode located in the interior of the reflector. The trend light emitting diode may be configured to be powered on with the plurality of light emitting diodes. The reference light emitting diode may be configured to flash a predetermined number of times each time the anti-collision light is powered on.

In various embodiments, the light emitting diode circuit board may further comprise a first optical sensor operationally coupled to the reference light emitting diode, and a second optical sensor operationally coupled to the trend light emitting diode. In various embodiments, the first optical sensor and the reference light emitting diode may be located in a first cavity defined by the reflector, and the second optical sensor and the trend light emitting diode may be located in a second cavity defined by the reflector.

In various embodiments, a comparison circuit may be configured to compare a brightness of the trend light emitting diode to a brightness of the reference light emitting diode. In various embodiments, comparison circuit may comprise an absolute threshold comparison circuit configured to compare an output of the first optical sensor to a predetermined absolute threshold, and a ratiometric comparison circuit configured to compare an output of the second optical sensor and the output of the first optical sensor.

In various embodiments, a controller and driver circuit board may be operationally coupled to the light emitting diode circuit board. The controller and driver circuit board may be configured to output a flash command to the plurality of light emitting diodes in response to the anti-collision light being powered on.

In various embodiments, the controller and driver circuit board may be configured to stop outputting the flash command if at least one of an output of the absolute threshold comparison circuit indicates the output of the first optical sensor is less than the predetermined absolute threshold or an output of the ratiometric comparison circuit indicates a comparison of the output of the second optical sensor to the output of the first optical sensor is less than the predetermined comparison threshold.

A method for performing an initial power-on self-check for an anti-collision light is also disclosed herein. In accordance with various embodiments, the method may comprising powering on the anti-collision light, flashing a trend light emitting diode located on a light emitting diode circuit board and a reference light emitting diode located on the light emitting diode circuit board a predetermined number of times, comparing a brightness of the trend light emitting diode to a brightness of the reference light emitting diode, and determining whether to send a flash command to a plurality of light emitting diodes located on the light emitting diode circuit board based on a comparison of the brightness of the trend light emitting diode to the brightness of the reference light emitting diode.

In various embodiments, the method may further comprise determining if the brightness the reference light emitting diode is greater than or equal to a threshold absolute brightness. In various embodiments, the method may further comprise sending the flash command to the plurality of light emitting diodes and to the trend light emitting diode if the comparison of the brightness of the trend light emitting diode to the brightness of the reference light emitting diode is greater than or equal to a predetermined comparison threshold.

In various embodiments, the method may further comprise turning off the plurality of light emitting diodes and the trend light emitting diode if the comparison of the brightness of the trend light emitting diode to the brightness of the reference light emitting diode is less than the predetermined comparison threshold.

In various embodiments, the trend light emitting diode and the reference light emitting diode may be located in an interior of a reflector and the plurality of light emitting diodes is locater around an exterior of the reflector.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option.

Throughout the present disclosure, like reference numbers denote like elements. Accordingly, elements with like element numbering may be shown in the figures, but may not be necessarily repeated herein for the sake of clarity.

Figure 1:
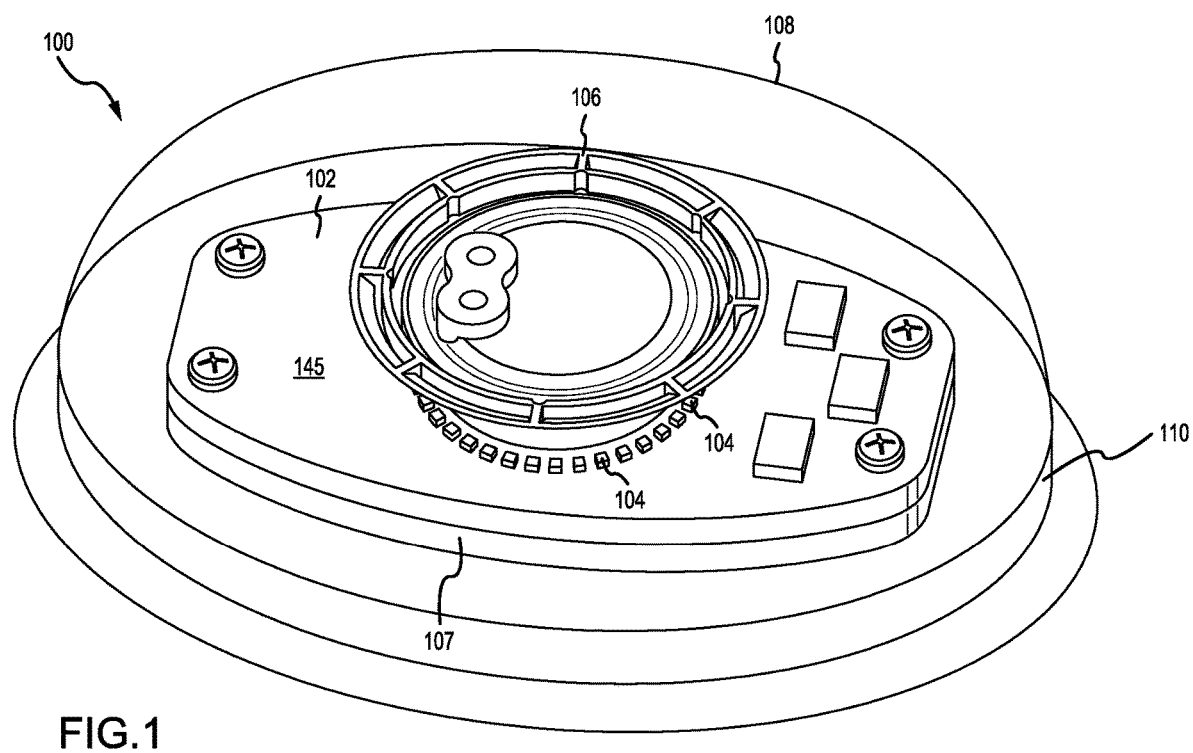
FIG. 1 illustrates an aircraft anti-collision light, in accordance with various embodiments.

With reference to FIG. 1, an exemplary aircraft anti-collision light (ACL) 100 is shown, in accordance with various embodiments. ACL 100 may comprise an LED circuit board 102 having plurality of LEDs 104 (referred to herein as "outer LEDs" 104) located thereon. A reflector 106 may be mounted to a surface 145 of LED circuit board 102. At least, a portion of reflector 106 may be located over outer LEDs 104. Reflector 106 is configured to distribute the light emitted from outer LEDs 104. A controller and driver circuit board 107 may be operationally coupled to LED circuit board 102 such that components of LED circuit board 102 are in electrical communication with (i.e., are electrically coupled to) components of controller and driver circuit board 107. A lens 108 may be located over LED circuit board 102, reflector 106, and controller and driver circuit board 107. Lens 108 may protect the circuitry of LED circuit board 102 and controller and driver circuit board 107. Lens 108, LED circuit board 102, and/or controller and driver circuit board 107 may be mounted to a base 110 of ACL 100. Base 110 may be mounted to an aircraft structure, for example, to a wing or other exterior aircraft surface.

Figure 2A:
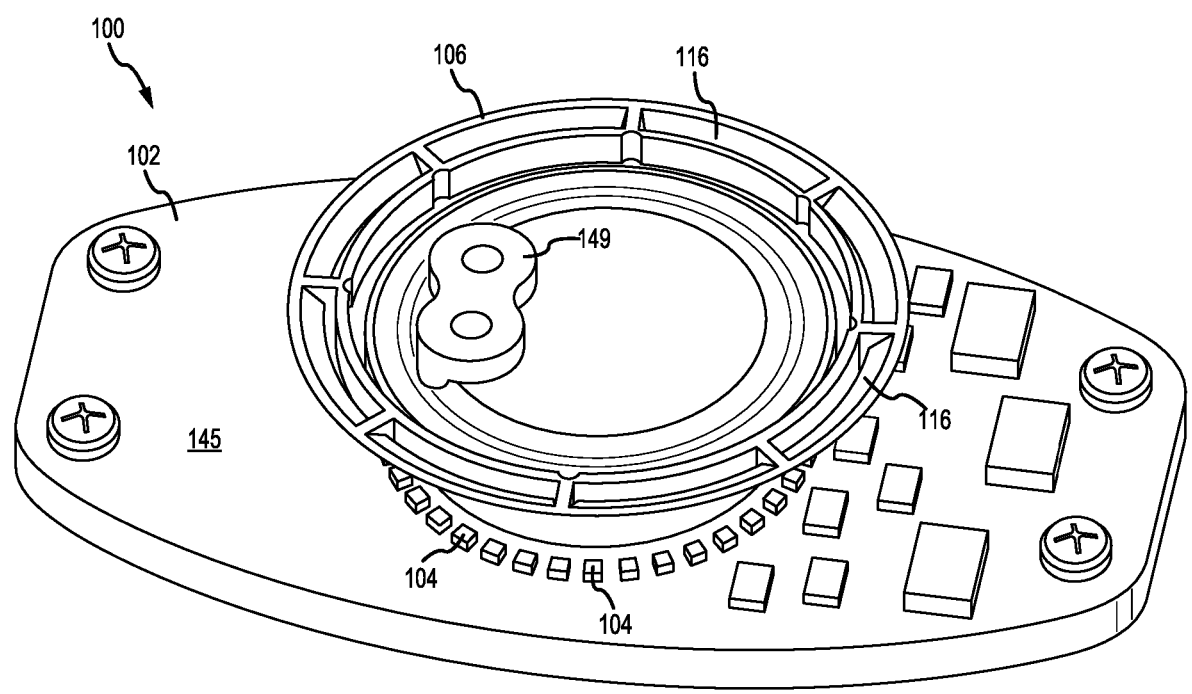
FIGS. 2A and 2B illustrate an LED circuit board of an end of life detection system for an aircraft anti-collision light, in accordance with various embodiments.
Figure 2B:
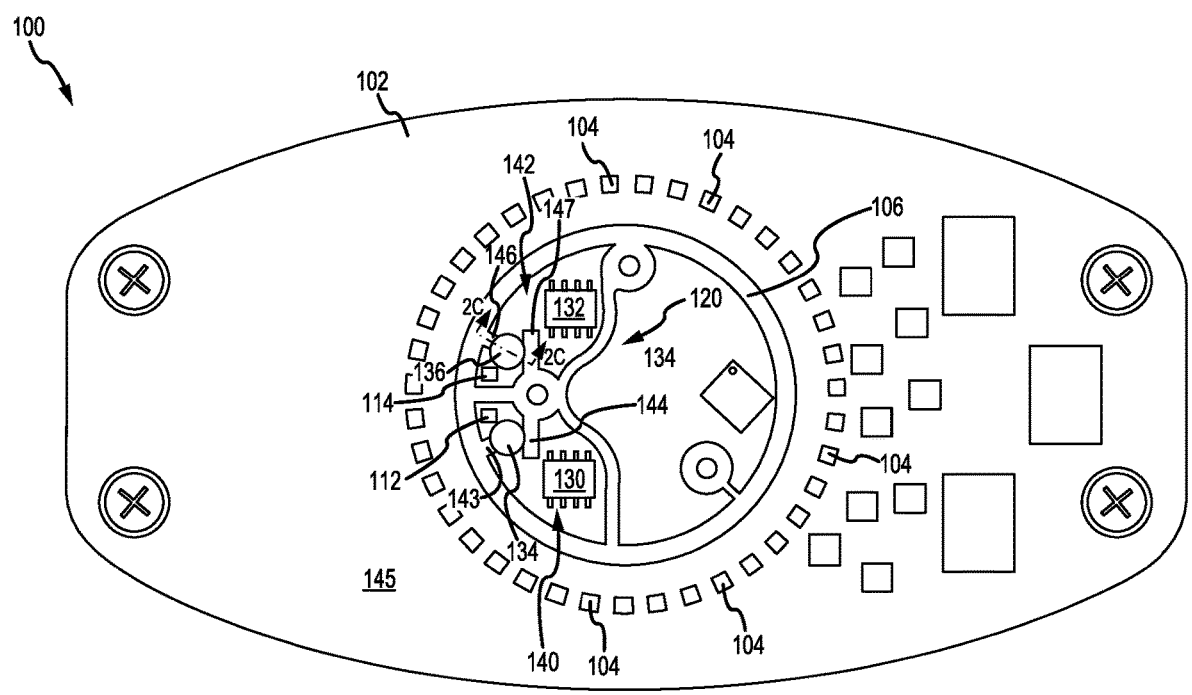

With reference to FIGS. 2A and 2B, additional details of LED circuit board 102 and reflector 106 are illustrated. In FIG. 2B, a portion of reflector 106 is removed to illustrate components located in an interior of reflector 106. In accordance with various embodiments, outer LEDs 104 may be oriented in a ring (i.e., 360°) about an exterior of reflector 106. In various embodiments, reflector 106 may include one or more mirror(s) 116 configured to redirect the light emitted from outer LEDs 104.

LED circuit board 102 is configured to flash outer LEDs 104 when ACL 100 is powered on. In accordance with various embodiments, LED circuit board 102 is further configured to perform an initial power-on self-check to determine if the light intensity of outer LEDs 104 meets a predetermined light intensity threshold (e.g., meets or exceeds FAA regulations relating to anti-collision light intensity). In this regard, LED circuit board 102 may include an end of life detection system 120 (FIG. 2B).

With reference to FIG. 2B, in accordance with various embodiments, end of life detection system 120 includes a reference LED 112 and a trend LED 114. Reference LED 112 and trend LED 114 are mounted on and supported by LED circuit board 102. Reference LED 112 and trend LED 114 may be electrically coupled to an electrical circuit that includes outer LEDs 104. Trend LED 114 is synchronized with outer LEDs 104 such that, while ACL 100 is turned on, trend LED 114 is configured to be powered on and flash at the same time as outer LEDs 104. Synchronizing trend LED 114 with outer LEDs 104 allows trend LED 114 to degrade or "age" at generally the same rate as outer LEDs 104.

In accordance with various embodiments, LED circuit board 102 is configured to power reference LED 112 during the initial powering on of outer LEDs 104, and to turn off (i.e., no longer power) reference LED 112 after a predetermined number of flashes. In this regard, reference LED 112 is powered on for an initial comparison to trend LED 114 and is then turned off. Stated differently, reference LED 112 is powered on during the initial power-on self-check and turned off after the initial power-on self-check. In various embodiments, LED circuit board 102 may be configured to flash reference LED 112 a predetermined number of times each time ACL 100 is powered on. For example, reference LED 112 may flash between one and twenty times, between two and ten times, between three and five times, or any desired number of times each time ACL 100 is powered on. In various embodiments, reference LED 112 flashes three times each time ACL 100 is powered on. After the initial flashes, reference LED 112 is bypassed or otherwise turned off, such that reference LED 112 does not continue flashing with outer LEDs 104. Powering reference LED 112 at the initial startup of ACL 100 preserves reference LED 112 such that even after thousands of hours of operation of outer LEDs 104, reference LED 112 exhibits little to no degradation. In this regard, reference LED 112 may be generally representative of the performance (e.g., brightness) of outer LEDs 104 at initial production (i.e., prior to degradation from use in ACL 100).

In accordance with various embodiments, end of life detection system 120 further includes an optical sensor 130 and an optical sensor 132. In various embodiments, each of optical sensor 130 and optical sensor 132 may comprise an optical sensor integrated circuit. Reference LED 112 is operationally coupled to optical sensor 130. Trend LED 114 is operationally coupled to optical sensor 132. Optical sensor 130 is configured to sense and/or measure an intensity (i.e., brightness) of the light emitted from reference LED 112. Optical sensor 132 is configured to sense and/or measure an intensity (i.e., brightness) of the light emitted from trend LED 114.

In accordance with various embodiments, reference LED 112 and optical sensor 130 are housed inside a cavity 140 defined by reflector 106. Trend LED 114 and optical sensor 132 are housed inside a cavity 142 defined by reflector 106. Cavity 140 may be identical, or nearly identical, to cavity 142 to increase the probability that reference LED 112 and trend LED 114 encounter the same environmental conditions and/or to prevent or reduce outside factors from affecting the comparison of trend LED 114 to reference LED 112.

Reference LED 112 may be optically coupled to optical sensor 130 through an optical path defined by reflector 106 and an optical attenuator 134. Stated differently, light emitted from reference LED 112 may travel to optical sensor 130 via an optical path defined by reflector 106 and optical attenuator 134. In various embodiments, optical attenuator 134 may be located between a first wall 143 and a second wall 144 of reflector 106. First and second walls 143, 144 may be located in the interior of reflector 106. First and second walls 143, 144 may define, at least, a portion of cavity 140. Optical attenuator 134, first wall 143, and second wall 144 may be located between reference LED 112 and optical sensor 130. Optical attenuator 134, first wall 143, and second wall 144 may be configured to block or prevent light emitted from reference LED 112 from reaching optical sensor 130. In various embodiments, optical attenuator 134 may translate relative to first and second walls 143, 144 and/or relative to surface 145 of LED circuit board 102. Translating optical attenuator 134 may tune, or otherwise control, the amount of light allowed to reach optical sensor 130. In this regard, a position of optical attenuator 134 is selected such that the amount of light reaching optical sensor 130 is within a measurable range of optical sensor 130 (i.e., the position of optical attenuator 134 is selected such that the light emitted from reference LED 112 does not saturate optical sensor 130).

Trend LED 114 may be optically coupled to optical sensor 132 through an optical path defined by reflector 106 and an optical attenuator 136. Stated differently, light emitted from trend LED 114 may travel to optical sensor 132 via an optical path defined by reflector 106 and optical attenuator 136. In various embodiments, optical attenuator 136 may be located between a third wall 146 and a fourth wall 147 of reflector 106. Third and fourth walls 146, 147 may be located in the interior of reflector 106. Third and fourth walls 146, 147 may define, at least, a portion of cavity 142. Optical attenuator 136, third wall 146, and fourth wall 147 may be located between trend LED 114 and optical sensor 132. Optical attenuator 136, third wall 146, and fourth wall 147 may be configured to block or prevent, at least, a portion of the light emitted from trend LED 114 from reaching optical sensor 132. In various embodiments, optical attenuator 136 may translate relative to third and fourth walls 146, 147 and/or relative to surface 145 of LED circuit board 102. Translating optical attenuator 136 may tune, or otherwise control, the amount of light allowed to reach optical sensor 132. In this regard, a position of optical attenuator 136 is selected such that the amount of light reaching optical sensor 132 is within a measurable range of optical sensor 132 (i.e., such that the light emitted from trend LED 114 does not saturate optical sensor 132).

Figure 2C:
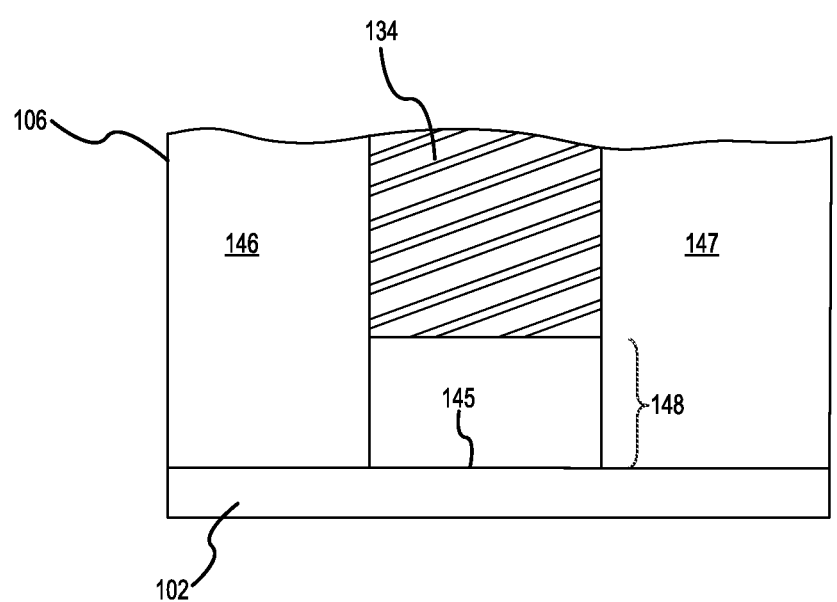
FIG. 2C illustrates a cross-section view of a reflector and an optical attenuator of an end of life detection system located over an LED circuit board, in accordance with various embodiments.

With reference to FIG. 2C, a cross-section view, taken along the line 2C-2C in FIG. 2B, of optical attenuator 136 extending between third wall 146 and fourth wall 147 of reflector 106 is illustrated. While FIG. 2C illustrates optical attenuator 136 it is contemplated and understood that optical attenuator 134, with momentary reference to FIG. 2B, is arranged in a similar manner and includes elements and the functionalities as described herein with reference to optical attenuator 136. In accordance with various embodiments, optical attenuator 136 may extend from third wall 146 to fourth wall 147. In various embodiments, optical attenuator 136 may be translated toward and away from surface 145 of LED circuit board 102. Translating optical attenuator 136 modifies optical path 148. In various embodiments, optical attenuator 136 may comprise a set screw. With combined reference to FIGS. 2A and 2B, in various embodiments, optical attenuator 134 may comprise a set screw. Optical attenuators 134, 136 may be in threaded engagement with an anchor portion 149 of reflector 106. Anchor portion 149 may be configured to couple optical attenuators 134, 136 to reflector 106. While optical attenuators 134, 136 are described as set screws, it is contemplated and understood that other means of optically attenuating the amount of light reaching optical sensors 130, 132 may be employed. For example, optical attenuators 134, 136 may comprise shutters configured to pivot relative to surface 145; optical attenuators 134, 136 may be located in slots defined by first and second walls 143, 144 and third and fourth walls 146, 147, respectively, and be configured to slide toward and away from surface 145. In various embodiments, optical attenuators 134, 136 may comprise one or more lenses. In various embodiments, optical attenuation may be achieved by painting one or more portions of first wall 143 and/or one or more portions of second wall 144 a light absorbing color and by painting one or more portions of third wall 146 and/or one or more portions of fourth wall 147 a light absorbing color.

The position of optical attenuator 136, third wall 146, and fourth wall 147 may match, or mirror, the position of optical attenuator 134, first wall 143, and second wall 144, respectively, such that the optical path between reference LED 112 and optical sensor 130 is identical, or nearly identical, to the optical path between trend LED 114 and optical sensor 132. During assembly, the optical paths for reference LED 112 and trend LED 114 may be mechanically tuned with optical attenuators 134, 136, respectively. The tuning may compensate for minor variations between reference LED 112 and trend LED 114 and/or for other manufacturing tolerances.

In accordance with various embodiments, reflector 106 is configured to isolate cavities 140, 142 from one another and from outer LEDs 104. In this regard, reflector 106 is configured to block light from entering or exiting cavity 140 and to block light from entering or exiting cavity 142. Isolating cavities 140, 142 tends to increase the probability that the output of optical sensors 130, 132 accurately reflects the light emitted from reference LED 112 and trend LED 114.

In accordance with various embodiments, the signals from optical sensors 130, 132 may be output to a comparison circuit (e.g., a comparator or operational-amplifier) configured to compare the intensity (i.e., brightness) of light emitted from trend LED 114 to the intensity (i.e., brightness) of the light emitted from reference LED 112. In various embodiments, the comparison circuit may be located on control and driver circuit board 107 (in FIG. 1). In various embodiments, the comparison circuit may be located on LED circuit board 102. In various embodiments, end of life detection system 120 is configured as an analog system. In this regard, end of life detection system 120 may be configured to perform the initial power-on self-check using a series of discrete circuits and/or without using software. Stated differently, end of life detection system 120 may use a series of discrete circuits to measure the intensity (i.e., brightness) of trend LED 114 and reference LED 112, to compare the intensity (i.e., brightness) of reference LED 112 to a threshold intensity (threshold brightness), to compare the intensity (i.e., brightness) of trend LED 114 to the intensity (i.e., brightness) of reference LED 112, and to provide power to outer LEDs 104 and/or cause outer LEDs 104 to flash based on the comparisons.

In accordance with various embodiments, end of life detection system 120 is configured such that if the comparison circuit outputs a signal corresponding to a satisfactory LED brightness (e.g., a signal indicating the brightness of trend LED 114 is greater than or equal to a scaled threshold brightness determined based on the brightness of the reference LED 112), then outer LEDs 104 continue to flash. End of life detection system 120 is further configured such that if the comparison circuit output a signal indicating the LED brightness requirement has not been met (e.g., a signal indicating the brightness of trend LED 114 is less than the scaled threshold brightness), outer LEDs 104 are turned off. Outer LEDs 104 not flashing, after ACL 100 has been turned on, indicates a failure of ACL 100. In this regard, outer LEDs 104 not flashing, after ACL 100 has been turned on, can alert the pilots, ground crew, or maintenance personnel to the failure, which may trigger a maintenance event.

Figure 3:
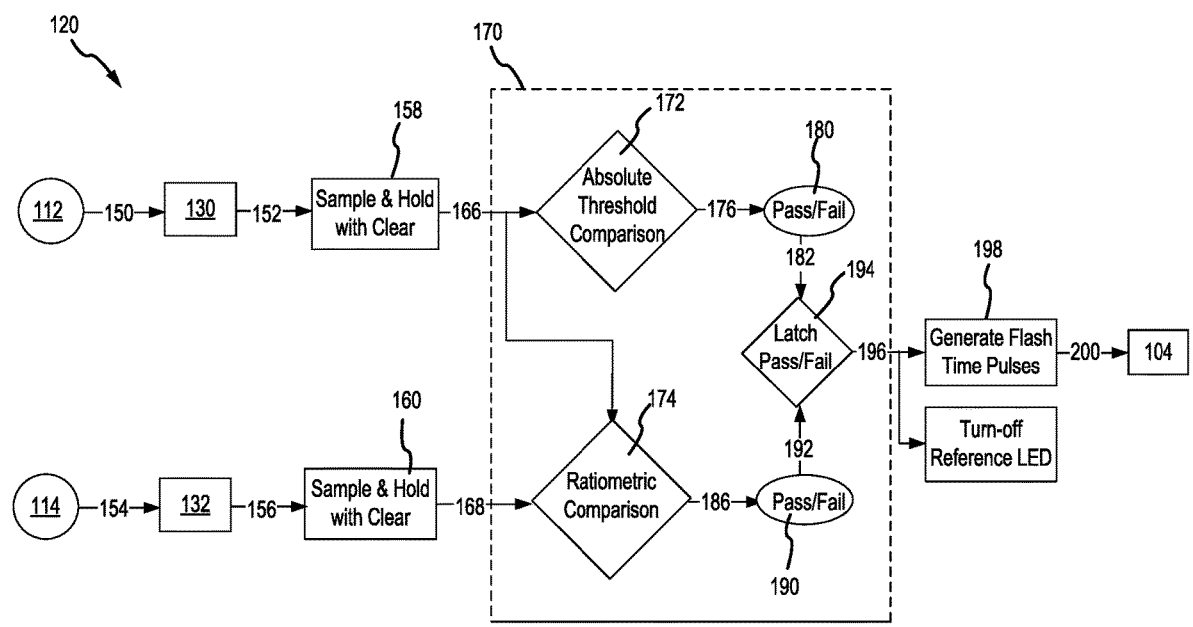
FIG. 3 illustrates components for an end of life detection system for an aircraft anti-collision light, in accordance with various embodiments.

With reference to FIG. 3, additional details of end of life detection system 120 are illustrated (schematically). In accordance with various embodiment, the light 150 emitted from reference LED 112 is sensed, or received, by optical sensor 130. Optical sensor 130 outputs signal 152 corresponding the detected brightness, or intensity, of the light 150 emitted by reference LED 112. The light 154 emitted from trend LED 114 is sensed, or received, by optical sensor 132. Optical sensor 132 outputs signal 156 corresponding the detected brightness, or intensity, of the light 154 emitted from trend LED 114.

Signal 152 from optical sensor 130 may be output to a sample and hold circuit 158. In various embodiments, sample and hold circuit 158 may also include a clearing circuit configured clear or eliminate the measurements from previous flash cycles, such that with each flash cycle, new or "clean" measurements from optical sensor 130 are used. Signal 156 from optical sensor 132 may be output to a sample and hold circuit 160. In various embodiments, sample and hold circuit 160 may also include a clearing circuit configured clear or eliminate the measurements from previous flash cycles, such that with each flash cycle, new or "clean" measurements from optical sensor 132 are used.

In accordance with various embodiments, the signal 166 output from sample and hold circuit 158 and the signal 168 output from sample and hold circuit 160 are sent to comparison circuit 170. In various embodiments, comparison circuit 170 may include an absolute threshold comparison circuit 172 and a ratiometric comparison circuit 174. Signal 166 from sample and hold circuit 158 may be sent to absolute threshold comparison circuit 172 and to ratiometric comparison circuit 174. Signal 168 from sample and hold circuit 160 may be sent to ratiometric comparison circuit 174.

Absolute threshold comparison circuit 172 is configured to compare signal 166 to a predetermined threshold signal. In this regard, absolute threshold comparison circuit 172 may be configured to determine if a brightness of reference LED 112 meets a predetermined threshold brightness (referred to herein as a predetermined absolute threshold). A signal 176 corresponding to the comparison of signal 166 to the predetermined threshold signal is sent to pass fail circuit 180. Pass fail circuit 180 is configured to output a signal 182 corresponding to a pass if signal 166 is greater than or equal to the predetermined threshold signal, and to output a signal 182 corresponding to a fail if signal 166 is less than the predetermined threshold signal. In this regard, the absolute threshold comparison circuit 172 may allow for a determination that reference LED 112 is turning on and is exhibiting a desired intensity (i.e., brightness) for the comparison to trend LED 114.

Ratiometric comparison circuit 174 is configured to compare signal 168 to signal 166. In this regard, ratiometric comparison circuit 174 may be configured to determine a brightness, or intensity, of trend LED 114 relative to the brightness, or intensity, of reference LED 112. A signal 186 corresponding to the comparison of signal 168 to and signal 166 is sent to pass fail circuit 190. Pass fail circuit 190 is configured to output a signal 192 indicating a pass if the comparison of signal 168 to signal 166 is greater than or equal to a predetermined comparison threshold and to output a signal 192 indicating a fail if the comparison of signal 168 to signal 166 is less than the predetermined comparison threshold. For example, pass fail circuit 190 may be configured to generate a pass signal if signal 186 indicates the intensity (i.e., brightness) of the light emitted from trend LED 114 is at least, for example, 70% of the intensity (i.e., brightness) of the light emitted from reference LED 112. Continuing with this example, pass fail circuit 190 may be configured to generate a fail signal if signal 186 indicates the intensity (i.e., brightness) of the light emitted from trend LED 114 is less than 70% of the intensity (i.e., brightness) of the light emitted from reference LED 112.

Pass fail signals 182, 192 may be output to a latch circuit 194. Latch circuit 194 is configured to output a signal 196 corresponding to pass the fail signals 182, 192 received from pass fail circuits 180, 190, respectively. Signal 196 is configured to cause reference LED 112 to be turned off or otherwise disabled, thereby preserving reference LED 112. For example, signal 196 may cause the power being provided to trend LED 114 and to outer LEDs 104 to bypass reference LED 112.

In accordance with various embodiments, signal 196 is also output to a flash generator circuit 198. Flash generator circuit 198 is configured such that if signal 196 indicates that signal 182 and signal 192 were both pass signals, signal 196 causes flash generator circuit 198 to continue to output a flash command (or signal) 200 to outer LEDs 104. Flash command 200 causes outer LEDs 104 to flash at a desired interval. Flash command 200 also causes trend LED 114 to flash at the same interval as outer LEDs 104. If signal 196 indicates that either signal 182 or signal 192 was a fail signal, flash generator circuit 198 does not output and/or disables the flash command 200. The lack of flash command 200 causes outer LEDs 104 and trend LED 114 to turn off.

End of life detection system 120 being configured to cause outer LEDs 104 to flash a predetermined number of times upon an initial powering on of ACL 100 and to cause outer LEDs 104 to stop flashing in response to detection of a light intensity failure allows ACL 100 to indicate to the pilots, ground crew, or maintenance personnel that the ACL 100 was turned on and/or that power is being provided to the ACL 100, but that another failure condition exits. This can lead to more targeted maintenance of ACL 100 (e.g., replacement of power supply versus replacement of outer LEDs 104). Outer LEDs 104 no longer flashing after the initial number flashes may indicate that the intensity (i.e., brightness) of ACL 100 has fallen below FAA regulations or that a determination of the outer LED intensity (i.e., brightness) was not made due to reference LED 112 failing to emit an acceptable brightness for comparison to trend LED 114. In either case, the stoppage flashing of outer LEDs 104 alerts the pilots, ground crew, or maintenance personnel to the failure, which can trigger a maintenance event.

Figure 4:
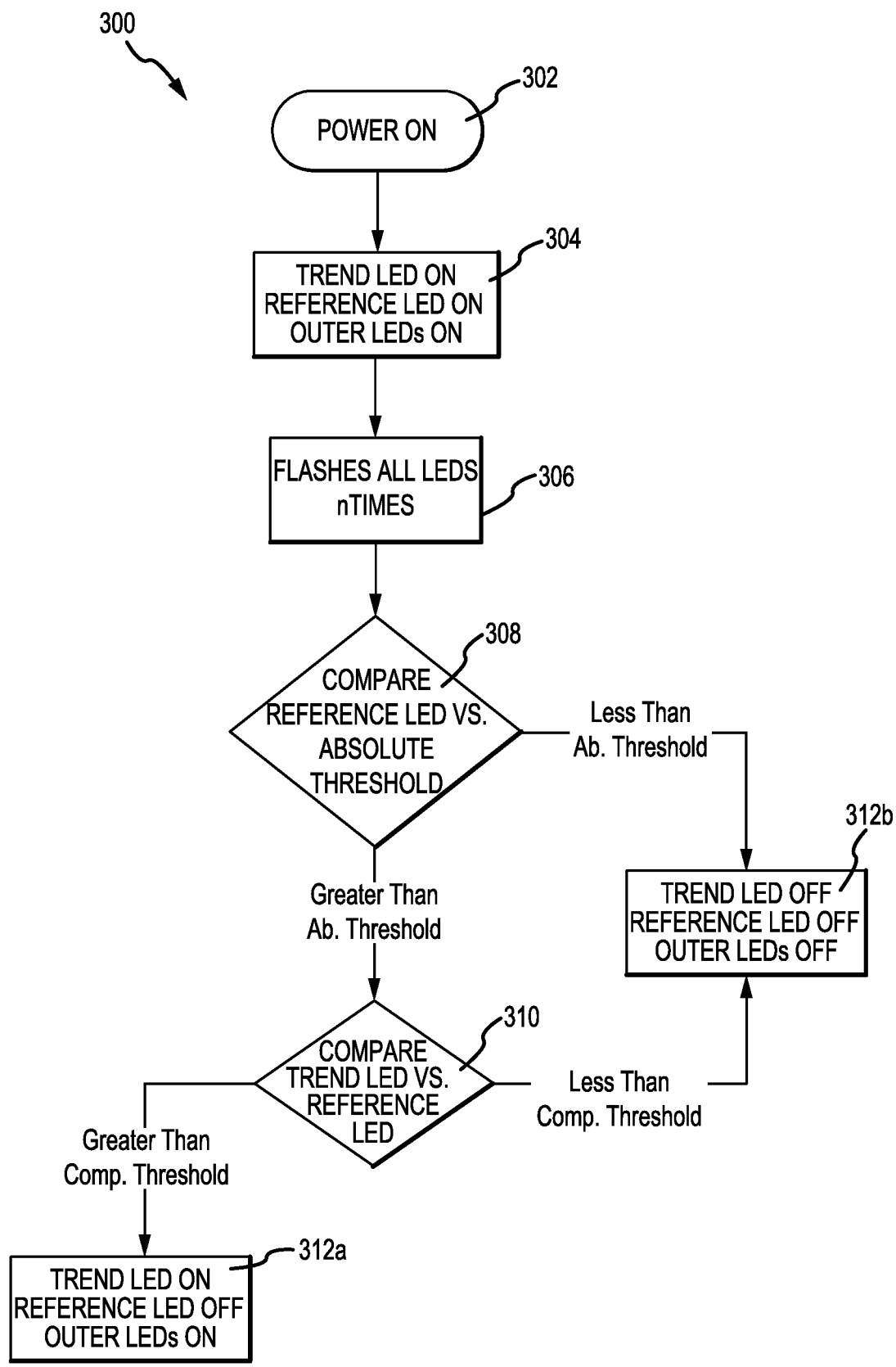
FIG. 4 illustrates a method for performing an initial power-on self-check for an anti-collision light, in accordance with various embodiments.

With reference to FIG. 4, a method 300 for performing an initial power-on self-check for an anti-collision light is illustrated. Method 300 may include powering on an ACL (step 302). Method 300 may include providing power to a plurality of outer LEDs, a reference LED, and a trend LED of the ACL (step 304). Method 300 may further include flashing the outer LEDs, the reference LED, and the trend LED a predetermined number of times (step 306). With combined reference to FIG. 4 and FIG. 2B, in accordance with various embodiments, step 302 may include power on ACL 100. Step 304 may include providing power to outer LEDs 104, reference LED 112, and trend LED 114. Step 306 may include flashing outer LEDs 104, reference LED 112, and trend LED 114 a predetermined number of times (e.g. three times).

In various embodiments, method 300 may include comparing the brightness of the reference LED 112 to a predetermined absolute threshold (step 308). In various embodiments, method 300 may include comparing a brightness of the trend LED 114 to a brightness of the reference LED 112 (step 310). In various embodiments, step 310 is performed if the brightness of reference LED 112 is greater than or equal to the predetermined absolute threshold.

Method 300 may further include turning off the reference LED 112 and turning on or continuing to flash the outer LEDs 104 and the trend LED 114 if a comparison of the brightness of trend LED 114 to the brightness of reference LED 112 is greater than or equal to a predetermined comparison threshold (step 312a). In various embodiments, step 312a may include determining if a signal corresponding to the brightness of trend LED 114 is greater than or equal to a scaled threshold brightness determined based on a signal corresponding to the brightness of the reference LED 112. The signal corresponding to the brightness of reference LED 112 may be output from a first optical sensor (e.g., optical sensor 130) operationally coupled to reference LED 112. The signal corresponding to the brightness of trend LED 114 may be output from a second optical sensor (e.g., optical sensor 132) operationally coupled to trend LED 114.

Method 300 may further include turning off the reference LED 112, the outer LEDs 104, and the trend LED 114 if either the brightness of reference LED 112 is less than the predetermined absolute threshold or the comparison of the brightness of trend LED 114 to the brightness of reference LED 112 is less than the predetermined comparison threshold (step 310b).

In various embodiments, method 300 may include attenuating the light emitted from the reference LED 112 to be within a measurable range of the first optical sensor. The attenuating the light emitted from the reference LED 112 may include translating a first optical attenuator (e.g., optical attenuator 134), located between the reference LED 112 and the first optical sensor, relative to a surface of the LED circuit board 102. In various embodiments, method 300 may include attenuating the light emitted from the trend LED 114 to be within a measurable range of the second optical sensor. The attenuating the light emitted from the trend LED 114 may include translating a second optical attenuator (e.g., optical attenuator 136), located between the trend LED 114 and the second optical sensor, relative to the surface of the LED circuit board 102.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An end of life detection system for an anti-collision light, comprising:
   a reflector;
   a plurality of light emitting diodes located around an exterior of the reflector;
   a trend light emitting diode located in an interior of the reflector, wherein the trend light emitting diode is configured to be powered on with the plurality of light emitting diodes; and
   a reference light emitting diode located in the interior of the reflector, wherein the reference light emitting diode is configured to be powered on during an initial power-on self-check and to be powered off after completion of the initial power-on self-check.

2. The end of life detection system of claim 1, further comprising:
   a first optical sensor operationally coupled to the reference light emitting diode; and
   a second optical sensor operationally coupled to the trend light emitting diode.

3. The end of life detection system of claim 2, wherein the first optical sensor and the reference light emitting diode are located in a first cavity defined by the reflector, and wherein the second optical sensor and the trend light emitting diode are located in a second cavity defined by the reflector.

4. The end of life detection system of claim 3, further comprising:
   a first optical attenuator located between the reference light emitting diode and the first optical sensor; and
   a second optical attenuator located between the trend light emitting diode and the second optical sensor.

5. The end of life detection system of claim 2, further comprising a comparison circuit configured to compare a brightness of the trend light emitting diode to a brightness of the reference light emitting diode.

6. The end of life detection system of claim 5, wherein the comparison circuit comprises:
   an absolute threshold comparison circuit configured to compare an output of the first optical sensor to a predetermined absolute threshold; and
   a ratiometric comparison circuit configured to compare an output of the second optical sensor to the output of the first optical sensor.

7. The end of life detection system of claim 6, wherein the plurality of light emitting diodes is turned off if at least one of the output of the first optical sensor is less than the predetermined absolute threshold or a comparison of the output of the second optical sensor to the output of the first optical sensor is less than a predetermined comparison threshold.

8. The end of life detection system of claim 7, wherein the reference light emitting diode is configured to flash between one and ten times during the initial power-on self-check.

9. An anti-collision light, comprising:
   a light emitting diode circuit board;
   a reflector located over the light emitting diode circuit board, wherein the light emitting diode circuit board includes:
      a plurality of light emitting diodes located around an exterior of the reflector;
      a trend light emitting diode located in an interior of the reflector, wherein the trend light emitting diode is configured to be powered on with the plurality of light emitting diodes; and
      a reference light emitting diode located in the interior of the reflector, wherein the reference light emitting diode is configured to flash a predetermined number of times each time the anti-collision light is powered on; and
   a lens located over the light emitting diode circuit board and the reflector.

10. The anti-collision light of claim 9, wherein the light emitting diode circuit board further comprises:
    a first optical sensor operationally coupled to the reference light emitting diode; and
    a second optical sensor operationally coupled to the trend light emitting diode.

11. The anti-collision light of claim 10, wherein the first optical sensor and the reference light emitting diode are located in a first cavity defined by the reflector, and wherein the second optical sensor and the trend light emitting diode are located in a second cavity defined by the reflector.

12. The anti-collision light of claim 11, further comprising a comparison circuit configured to compare an brightness of the trend light emitting diode to a brightness of the reference light emitting diode.

13. The anti-collision light of claim 12, wherein the comparison circuit comprises:
    an absolute threshold comparison circuit configured to compare an output of the first optical sensor to a predetermined absolute threshold; and
    a ratiometric comparison circuit configured to compare an output of the second optical sensor and the output of the first optical sensor.

14. The anti-collision light of claim 13, further comprising a controller and driver circuit board operationally coupled to the light emitting diode circuit board, wherein the controller and driver circuit board is configured to output a flash command to the plurality of light emitting diodes on the light emitting diode circuit board in response to the anti-collision light being powered on.

15. The anti-collision light of claim 14, wherein the controller and driver circuit board is configured to stop outputting the flash command if at least one of an output of the absolute threshold comparison circuit indicates the output of the first optical sensor is less than the predetermined absolute threshold or an output of the ratiometric comparison circuit indicates a comparison of the output of the second optical sensor to the output of the first optical sensor is less than a predetermined comparison threshold.

16. A method for performing an initial power-on self-check for an anti-collision light, the method comprising:
    powering on the anti-collision light;
    flashing a trend light emitting diode located on a light emitting diode circuit board and a reference light emitting diode located on the light emitting diode circuit board a predetermined number of times;
    comparing a brightness of the trend light emitting diode to a brightness of the reference light emitting diode; and determining whether to send a flash command to a plurality of light emitting diodes located on the light emitting diode circuit board based on a comparison of the brightness of the trend light emitting diode to the brightness of the reference light emitting diode.

17. The method of claim 16, further comprising determining if the brightness the reference light emitting diode is greater than or equal to a threshold absolute brightness.

18. The method of claim 16, further comprising sending the flash command to the plurality of light emitting diodes and to the trend light emitting diode if the comparison of the brightness of the trend light emitting diode to the brightness of the reference light emitting diode is greater than or equal to a predetermined comparison threshold.

19. The method of claim 18, further comprising turning off the plurality of light emitting diodes and the trend light emitting diode if the comparison of the brightness of the trend light emitting diode to the brightness of the reference light emitting diode is less than the predetermined comparison threshold.

20. The method of claim 19, wherein the trend light emitting diode and the reference light emitting diode are located in the interior of a reflector and the plurality of light emitting diodes is locater around an exterior of the reflector.

* * * * *